Feb. 15, 1955 G. F. RACKETT 2,702,312

LIGHTING FOR TELEVISION

Filed Oct. 3, 1949 2 Sheets-Sheet 1

INVENTOR.
Gerald F. Rackett
BY
Lyon & Lyon
ATTORNEYS

Feb. 15, 1955 G. F. RACKETT 2,702,312

LIGHTING FOR TELEVISION

Filed Oct. 3, 1949 2 Sheets-Sheet 2

INVENTOR.
Gerald F. Rackett
BY Lyon & Lyon
ATTORNEYS.

United States Patent Office 2,702,312

Patented Feb. 15, 1955

2,702,312

LIGHTING FOR TELEVISION

Gerald F. Rackett, Sherman Oaks, Calif., assignor to Columbia Pictures Corporation, Los Angeles, Calif., a corporation of New York Application October 3, 1949, Serial No. 119,329

5 Claims. (Cl. 178—7.1)

Figure 1:
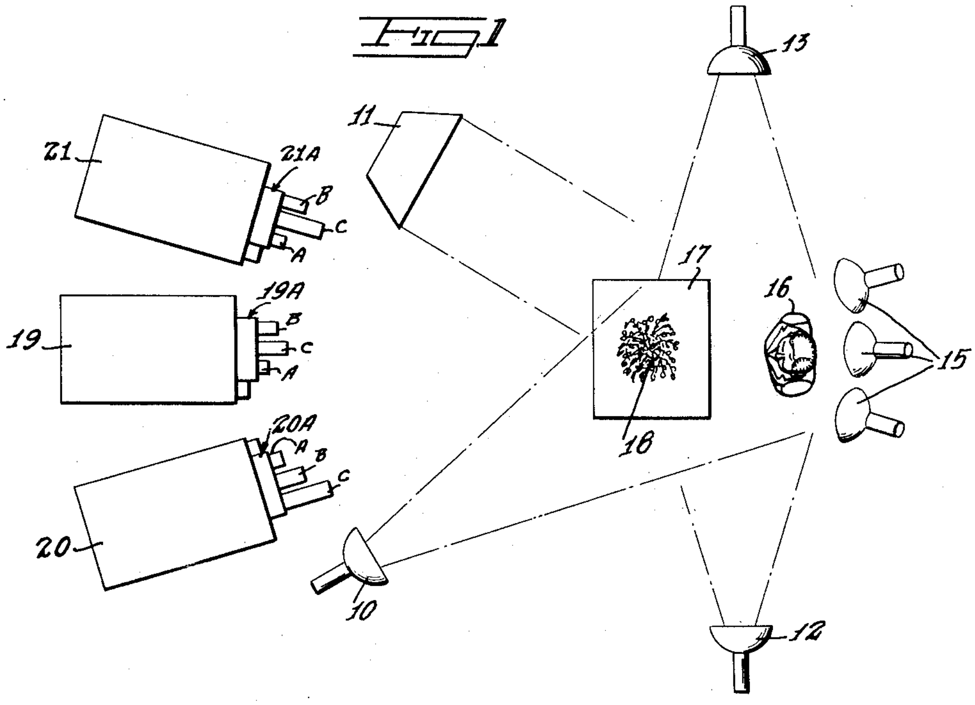

The present invention relates to an improved television system, and specifically to an arrangement wherein the lighting of subjects being televised is automatically changed in accordance either with the focusing of a particular television camera or with the selection at a monitoring station, of a particular television camera from a group of such cameras, all arranged to televise the same scene.

In the present state of the television art, when scenes being televised are illuminated by other than natural daylight, the quality of illumination on, and the image on the screen of the television receiver, is relatively poor compared to pictures reproduced using the techniques developed in the motion picture photographic art. This relatively poor quality arises in part from the present practice in the television art of using a plurality of television cameras at different locations, each viewing the same scene, but with the focal lengths of the lens in each of such cameras different from present corresponding different fields of view.

Thus, for example, when a dramatic sequence involving three people is being televised, one camera at a first location may be used continuously or intermittently to cover the entire field of action, i. e., such one camera being focused for a "long shot;" a second camera at a second or the same location may be focused so as to cover the action of one of such three persons with varying degrees of intimacy, using different focal length lenses to produce what may be termed "medium" and "close shots;" and, the third camera at a third location or the same location may be used to cover the interchange of dialogue between two of such persons with varying degrees of intimacy, using for that purpose lenses of the desired focal length to produce what might be termed "two shots" or "tight two shots."

In the continuous portrayal of dramatic action as currently practiced in television, the entire field of action is lighted generally with what is known as "flat illumination," because of the high contrast characteristics of the television transfer.

The photographic art teaches that flat lighting fails to establish perspective and planes of depth necessary for the proper delineation of a long shot, and that the position of the camera from which a long shot can best be made is not the optimum position of a camera for either a medium shot, close up or two shot. The proper lighting required for a long shot is substantially different from the proper lighting required for a medium shot or close up. Consequently, for the best photography of long shots, medium shots and close ups, not only must the effective position of the camera be changed but also the type of lighting should be changed simultaneously.

It is therefore an object of the present invention to provide an improved television system in which the type lighting is varied automatically in accordance with the focused condition of a television camera to achieve better television images.

Another object of the present invention is to provide an improved television system in which different types of lights in a television studio may be energized automatically in accordance with the selection of a particular one of a plurality of television cameras each focused differently to present corresponding different fields of view.

Another object of the present invention is to provide an improved television system having as one of its desideratum the object set forth in the preceding paragraph, which is characterized by an electrical switching arrangement whereby different types of lights are each simultaneously energized in the transition of adjusting the focusing arrangement of the camera from one position to the other so as to produce a blending of the two different types of light.

Still another object of the present invention is to provide a switching arrangement associated with the lens turret of a television camera which serves to connect into an electrical circuit a desired set of lights optimumly related to the type of focusing accomplished by the lens turret.

Still another object of the present invention is to provide an improved television system wherein monitoring and camera selection means are provided to select for radio transmission the image televised by any one of a plurality of television cameras and wherein the type of lighting on the scene being televised is automatically changed upon making such selection.

Yet another object of the present invention is to provide an improved television system of the type described in the next preceding paragraph, characterized by the fact that the movable lens turret of the camera is associated with a switching arrangement which serves to connect into an electrical circuit a desired set of lights optimumly related to the type of focusing accomplished by the lens turret.

Still another object of the present invention is to provide an improved television system in which the type of illumination is automatically changed with focusing of the television camera, thereby assuring the optimum type of lighting for a given focused condition of the camera.

Figure 2:
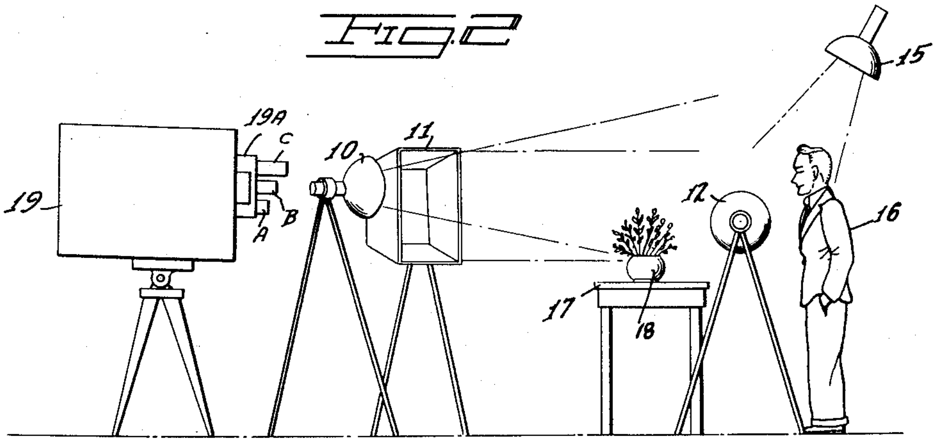
Figure 3:
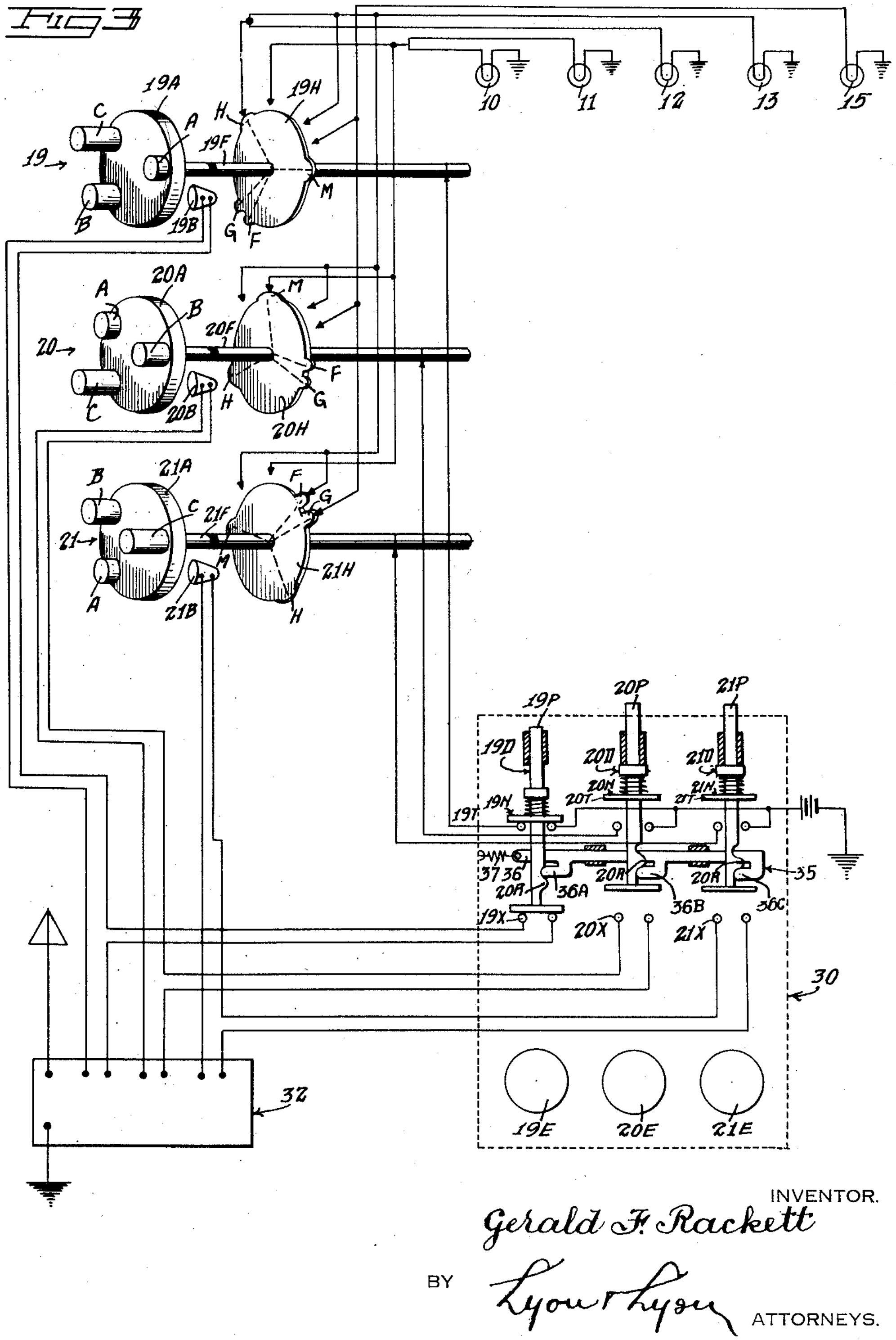

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a top plan view of apparatus in a television studio connected, as more specifically shown in Figure 3, for achieving the objects of the present invention, it being noted that the television cameras 19, 20, 21 may be placed further from the subject 16 than is indicated in this figure, Figure 2 is a view in side elevation of a portion of the apparatus shown in Figure 1 and Figure 3 shows the manner in which the apparatus shown in the previous figures is connected in an electrical circuit in accordance with features of the present invention.

Generally there are four types of lighting arrangements used in photographing various scenes effectively. These four types of light may be classified generally as follows: (1) key lighting; (2) back lighting; (3) fill lighting, and (4) cross lighting.

Oftentimes, in photographic practice, it is desirable to use one or more of such four different lighting arrangements in combination. These four different types of lighting may be produced by the apparatus shown in Figure 1, wherein the light source 10 throws a shaft of light in the form of a key light, the light source 11 throws a light which may be termed a "fill" light, the light sources 12, 13 throw beams of light in opposite directions one towards the other, which may be termed "cross" lights, and the light sources 15 throw beams of light which may be termed "back" lights.

The key light 10 generally provides the principal overall lighting and is used in taking long shots. The fill light 11 is intended to supply light to those regions of the subject being televised which otherwise might be in a shadow, and generally the fill light 11 is a diffused light for raising the degree of illumination of portions of the subject otherwise in a shadow. In general, the cross lights 12, 13 are usually used one at a time to produce shadows, while the back lights 15 are used to produce relief effects.

The combination of lights 10, 11, 12, 13 and 15, arranged with respect to the person 16 being televised and the table 17 with the ornament 18 thereon and the conventional television cameras 19, 20, 21, are positioned for automatically producing any one of the four different types of lighting enumerated above or a mixture of any one of such four types of light in accordance with the positioning of the lens turrets 19A, 20A, 21A of cameras 19, 20, 21 respectively.

These groups of different lights 10, 11, 12, 13 and 15 are, of course, of the electrical type, either the incandescent filament type or arc light type with movable light opaque diaphragms, and are connected in an electrical circuit as shown, for example, in Figure 3, to produce a combination optimum lighting effect for the three types of shots mentioned hereinabove, namely a long shot, medium shot and close shot.

The cameras 19, 20, 21 each have three lenses A, B, C, fixedly mounted on their corresponding rotatable turrets 19A, 20A, 21A for focusing the respective cameras respectively for the aforementioned "close" shots, "medium" shots and "long" shots. In Figure 3, thus, the camera 21 is focused to project through its lens A "close" shots onto the associated iconoscope 21B; the camera 19 is focused to project through its lens B, "medium" shots, onto its associated iconoscope 19B; and, the camera 20 is focused to project through its lens C "long" shots onto its associated iconoscope 20B.

In order to achieve the desirable results indicated above, the type of lighting should correspond to the type of shot being transmitted from the television station. For example, when "long" shots are being transmitted it may be desirable to energize only the key light 10 and fill light 11; to energize only the cross lights 12, 13 when "medium" shots are being transmitted; and, to energize only the back lights 15 and cross lights 12, 13 when "close" shots are transmitted.

The electrical circuit for producing this result is shown in Figure 3. In Figure 3 the lens turrets 19A, 20A and 21A may each be rotated to any one of its three positions to produce any one of the three shots, namely, "long," "close" and "medium" shots.

It is customary practice, in television studios, to switch the individual cameras 19, 20 and 21 in changing over to transmit the different shots, instead of rotating the turret of the camera for in the latter instance the change is not sufficiently abrupt. Usually one of the cameras is set, as is the camera 21, for the production of close shots, a second camera such as the camera 19 is conditioned for the production of medium shots, and a third camera such as the camera 20 may be conditioned for the production of long shots; and, in order to effect a change in the type of shot being transmitted, the individual cameras are switched in and out of the transmitting circuit by switches disposed at, for example, the monitoring station 30.

At such monitoring station 30 there may be a cathode ray tube 19E for reproducing the medium shot image developed by camera 19; a second cathode ray tube 20E for reproducing the long shot image developed by camera 20; and a third tube 21E for reproducing the close shot image developed by camera 21. A person at such monitoring station 30 may switch in either one of such cameras 19, 20, 21 in the television transmitting circuit 32 by actuation of the corresponding push button switches 19D, 20D or 21D, as he may desire. The particular circuit arrangement for accomplishing this is described hereinafter.

Each one of the camera turrets 19A, 20A, and 21A have mechanically coupled thereto, through a corresponding electrically insulated shaft 19F, 20F and 21F, an insulated corresponding wafer 19H, 20H and 21H. Each one of such insulated wafers have mounted on the periphery thereof metallic contact members F, G, H and M, each one of such contact members F, G, H, and M being connected as indicated by the dotted lines to their corresponding insulated shafts 19F, 20F and 21F, and being movable with such corresponding shafts into engagement with stationary contacts (indicated by the arrows), which are connected in a predetermined pattern with terminals of the lights 10, 11, 12, 13 and 15 for producing the results indicated above.

These metallic contacts F, G, H and M are so disposed on the periphery of their corresponding wafers 19H, 20H and 21H; that when the corresponding camera is adjusted for close shots (as is the camera 21) the contacts F, G serve to connect the left-hand terminals (Figure 3) of the cross lights 12 and 13 and back lights 15 to one terminal of the corresponding switch 21N; that when the camera is adjusted for medium shots (as is the camera 19) the contact H connects the left-hand terminals of the cross lights 12, 13 to one terminal of the corresponding switch 19N; and, that when the associated camera is adjusted for long shots (as is the camera 20) the contact M connects the left-hand terminals of the key light 10 and fill light 11 to one terminal of the corresponding switch 20N. It is noted that the right-hand terminals of each one of the lights 10, 11, 12, 13 and 15 is grounded and that the other terminals of such previously mentioned switches 19N, 20N and 21N are each connected to the ungrounded terminal of voltage source 32, so that actuation of any one of the switches 19N, 20N or 21N, at the desire of the producer, results in energization of a group of the lights 10, 11, 12, 13 and 15, depending upon the originally preset condition of the turrets 19A, 20A or 21A.

More specifically, when the switch 19D is moved to its actuated position shown in Figure 3, the cross lights 12, 13 only are illuminated with the related camera 19 focused for taking medium shots. Upon actuation of the switch 20D, the related switch 20N is closed and the originally closed switch 19N is opened (by means described later), to thereby produce energization of the key light 10 and fill light 11. And when the switch 21D is actuated the cross lights 12, 13 and back light 15 are energized.

In other words, as is evident from the description hereinabove, the switch 19N is serially connected with the switches actuated upon rotation of the insulated shaft 19F; the switch 20N is serially connected with the switches actuated upon rotation of shaft 20F; and the switch 21N is serially connected with the switches actuated upon rotation of the shaft 21F. Further, it is evident that any group of ungrounded terminals of the light sources 10, 11, 12, 13 and 15, as desired, may be connected to such switches which are actuated respectively upon rotation of shafts 19F, 20F and 21F, to produce correspondingly different lighting effects depending upon the position of the respective lens turrets 19A, 20A and 21A. It is observed also that only one of such combination of lights may be energized continuously, depending upon which one of switches 19N, 20N or 21N is closed.

These switches 19N, 20N and 21N are part of push button assemblies 19D, 20D and 21D respectively, only one of which may be held in a latched or closed position by the latching mechanism 35, including the spring biased latching bar 36. This latching bar 36 is normally biased to the left in Figure 3 by the coil tension spring 37 with abutments 36A, 36B and 36C thereof contacting the reciprocal push button switching bars 19P, 20P and 21P. Such bars 19P, 20P and 21P each have a reentrant portion adjacent a cam portion as shown in Figure 3. As shown in Figure 3, the abutment 36A engages the reentrant portion of bar 19P to maintain the switch 19D in its actuated or closed position. If it is desired to actuate switch the bar 20P is depressed so as to bring the cammed projection 20R into engagement with the abutment 36B, to thereby move the abutment 36A out of engagement with the reentrant portion in the bar 19P. Continued downward movement of bar 20P results in engagement of the abutment 36B with the reentrant portion in the bar 20P, to thereby maintain such bar in its depressed or circuit closing position.

It is noted that the switches 19N, 20N and 21N are of special construction and each incorporate a corresponding bendable switch contacting member 19T, 20T and 21T. The purpose of such switch contact members 19T, 20T and 21T being to cause two of such switches 19N, 20N or 21N, as the case may be, to be simultaneously closed for a brief time interval when and as such switches 19D, 20D and 21D are actuated, to thereby produce a blending or smooth transition in lighting effects as such switches are actuated. For example, when the switch 19D is in its closed position as shown in Figure 3, the lights 12 and 13 are energized through switch 19N, which includes the deformable and resilient switch contacting member 19T; and then, upon actuation of the switch 20D, the switch 20N is closed simultaneously with the switch 19N before such switch 19N opens, whereby, for a brief instant, in the order of approximately one-tenth of a second, the lights 12, 13 are illuminated simultaneously with the lights 10 and 11 energized through switch 20N. This time interval of one-tenth of a second is determined largely by the resilient nature of the switch contact 19T which moves to its normal unstressed condition when and as the bar 19P moves upwardly under the influence of the coil compression spring 19S.

Each one of the push button switch assemblies 19D, 20D and 21D has also associated therewith a corresponding normally open switch 19X, 20X, 21X, for connecting the video output of the corresponding iconoscope 19B, 20B, 21B to the modulator stage in the television transmitter 32, it being noted that this switching arrangement allows the transfer of the video from only one of the tubes 19B, 20B, 21B to such modulator stage within the transmitter 32. Further, as is well understood, the cathode ray tubes 19E, 20E and 21E may at all times be effective to reproduce the video output of the associated iconoscopes 19B, 20B and 21B, whereby the person at the monitoring station 30 may at a glance observe the picture being "taken" by any one of the cameras 19, 20, 21, and may select the video output of any one of the cameras (by actuating switches 19D, 20D, or 21D) for transmission by the television video transmitter 32. Upon actuation of such switches 19D, 20D, 21D, as explained in detail hereinabove, not only is a particular video output selected, but also the lighting is changed.

Thus, when the producer at station 30 selects the video output of any one of the plurality of television cameras 19, 20, 21, he automatically effects a change in the type of lighting.

While the particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a television system of the character described, a plurality of lights each arranged to produce a different lighting effect on scenes being televised, a plurality of television cameras each having a lens system adjustably mounted thereon to adjust the focusing of the corresponding camera, a first plurality of non-sequential selecting switches at a monitoring station any one of which may, at any one particular time, be selected and operated, each of said switches corresponding to a different camera, a second plurality of switches actuated upon adjustment of said lens system, each one of said second plurality of switches corresponding to a different lighting effect, and a serial electrical circuit connected to a source of voltage for said lights comprising said lights and said first and said second plurality of switches.

2. In a television system of the character described, a plurality of television cameras each focused differently, a plurality of lights each in different position and arranged to produce a different lighting effect on scenes being televised, a television transmitter, selective non-sequentially operated switching means connecting the video output of a selected one of said television cameras to said transmitter to modulate the same in accordance therewith, and means operated upon operation of said selective switching means to energize different ones of said plurality of lights corresponding to the video output of the camera selected.

3. The arrangement claimed in claim 2 characterized by the fact that said means to energize different ones of said lights serves to momentarily and simultaneously energize a plurality of different ones of said lights to effect a smooth transition in lighting when said selective switching means is operated.

4. In a television system of the character described, a plurality of lights each arranged to produce a different lighting effect on scenes being televised, a plurality of television cameras each having a lens system adjustably mounted thereon to adjust the focusing of a corresponding camera, a first plurality of switches, each of said switches corresponding to a different camera, a second plurality of switches actuated upon adjustment of said lens system, each one of said second plurality of switches corresponding to a different lighting effect, a serial electrical circuit connected to a source of voltage for said lights comprising said lights and said first and said second plurality of switches, a television transmitter, selective non-sequentially operated switching means connecting the video output of a selected one of said television cameras to said transmitter to modulate the same in accordance therewith, said first plurality of switches being actuated upon actuation of said selective switching means and serving to momentarily and simultaneously energize a plurality of different ones of said lights to effect a smooth transition in lighting when said selective switching means is operated.

5. In a television system of the character described, a plurality of television cameras all focused differently, a plurality of lights each arranged to produce a different lighting effect on scenes being televised, a television transmitter, selective non-sequentially operated switching means connecting the video output of a selected one of said television cameras to said transmitter to modulate the same in accordance therewith, means operated upon operation of said selected switching means to energize different means of said plurality of lights corresponding to the video output of the camera selected, said last-mentioned means including switching means positioned in accordance with the focused condition of the camera selected.

References Cited in the file of this patent

UNITED STATES PATENTS

| | | |
|---|---|---|
| 2,244,687 | Goldsmith | June 10, 1941 |
| 2,244,688 | Goldsmith | June 10, 1941 |
| 2,343,971 | Goldsmith | Mar. 14, 1944 |
| 2,381,901 | Goldsmith | Aug. 14, 1945 |

FOREIGN PATENTS

| | | |
|---|---|---|
| 776,655 | France | Jan. 31, 1935 |